US011324067B2

(12) United States Patent
Otaka et al.

(10) Patent No.: US 11,324,067 B2
(45) Date of Patent: May 3, 2022

(54) COMMUNICATION APPARATUS (71) Applicant: HONDA MOTOR CO., LTD., Tokyo (JP)

(72) Inventors: Masaru Otaka, Wako (JP); Yasuhiro Konno, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/747,777

(22) Filed: Jan. 21, 2020

(65) Prior Publication Data

US 2020/0275516 A1  Aug. 27, 2020

(30) Foreign Application Priority Data

Feb. 26, 2019 (JP) .............................. JP2019-032991

(51) Int. Cl.
 *H04W 76/38* (2018.01)
 *H04W 76/28* (2018.01)
 *H04W 76/27* (2018.01)
(52) U.S. Cl.
 CPC ........... *H04W 76/27* (2018.02); *H04W 76/28* (2018.02); *H04W 76/38* (2018.02)
(58) Field of Classification Search
 CPC ..... H04W 76/27; H04W 76/38; H04W 76/28; H04W 52/28; H04W 24/02; H04W 52/02
 See application file for complete search history.

(56) References Cited

U.S. PATENT DOCUMENTS

| 8,116,246 | B2 * | 2/2012 | Min | H04W 52/343 370/311 |
| 8,582,483 | B1 * | 11/2013 | Yu | H04W 76/28 370/311 |
| 8,588,140 | B2 | 11/2013 | Xu et al. | |
| 2011/0058521 | A1 | 3/2011 | Xu et al. | |
| 2014/0228016 | A1 * | 8/2014 | Futaki | H04W 36/0058 455/422.1 |
| 2016/0157164 | A1 * | 6/2016 | Lee | H04W 24/02 370/329 |

(Continued)

FOREIGN PATENT DOCUMENTS

| JP | H08-336178 A | 12/1996 |
| JP | 2011-520364 A | 7/2011 |
| WO | 2018/226238 A1 | 12/2018 |

OTHER PUBLICATIONS

3GPP, 3rd Generation Partnership Project; Technical Specification Group Radio Access Network; Evolved Universal Terrestrial Radio Access (E-UTRA); Radio Resource Control (RRC) (Release 15), Sep. 2018, 3GPP TS 36.331 V15.3.0, Valbonne, France.

(Continued)

*Primary Examiner* — Andrew Wendell
(74) *Attorney, Agent, or Firm* — Thomas | Horstemeyer, LLP (57) ABSTRACT

A communication apparatus includes an obtaining unit configured to obtain information indicating an operation state of a user equipment, and a determining unit configured to determine, based on the operation state of the user equipment, a change time taken by a changing unit to change communication between the user equipment and a wireless base station to an idle state after a predetermined condition has been met.

18 Claims, 8 Drawing Sheets

(56) References Cited

U.S. PATENT DOCUMENTS

| | | | |
|---|---|---|---|
| 2016/0337898 A1* | 11/2016 | Jeong | H04W 12/0431 |
| 2017/0289875 A1* | 10/2017 | Cui | H04W 36/08 |
| 2018/0098311 A1* | 4/2018 | Hong | H04M 1/724 |
| 2019/0028985 A1* | 1/2019 | Wang | H04W 56/001 |
| 2019/0159278 A1* | 5/2019 | Takahashi | H04W 36/0022 |
| 2019/0191483 A1* | 6/2019 | Ryoo | H04W 76/27 |
| 2019/0260461 A1* | 8/2019 | Kim | H04W 72/085 |

OTHER PUBLICATIONS

Japanese Office Action issued for Japanese Patent Application No. 2019-032991 dated Feb. 28, 2022 (with Partial Translation).

\* cited by examiner

| Device Type | Control Type | UL RESOURCE RELEASE | DRX | IDLE |
|---|---|---|---|---|
| IoT | NO | 1,000 ms | 2,000 ms | 3,000 ms |
| TELEPHONE | NO | 1,000 ms | 2,000 ms | 5,000 ms |
| VEHICLE | INACTIVATE | 10 ms | 30 ms | 60 ms |
| VEHICLE | MANUAL DRIVING | 3,000 ms | 5,000 ms | 10,000 ms |
| VEHICLE | REMOTE DRIVING | infinity | infinity | 15,000 ms |
| VEHICLE | AUTOMATED DRIVING | infinity | infinity | 20,000 ms |

FIG. 4B

| Device Type | Control Type | | TIMER VALUE |
|---|---|---|---|
| IoT | NO | IDLE | |
| | | DRX | |
| | | UL RESOURCE RELEASE | |
| TELEPHONE | NO | IDLE | |
| | | DRX | |
| | | UL RESOURCE RELEASE | |
| VEHICLE | INACTIVATE | IDLE | |
| | | DRX | |
| | | UL RESOURCE RELEASE | |
| VEHICLE | MANUAL DRIVING | IDLE | |
| | | DRX | |
| | | UL RESOURCE RELEASE | |
| VEHICLE | REMOTE DRIVING | IDLE | |
| | | DRX | \<infinity\> |
| | | UL RESOURCE RELEASE | \<infinity\> |
| VEHICLE | AUTOMATED DRIVING | IDLE | |
| | | DRX | \<infinity\> |
| | | UL RESOURCE RELEASE | \<infinity\> |

COMMUNICATION APPARATUS

CROSS-REFERENCE TO RELATED APPLICATION(S)

This application claims priority to and the benefit of Japanese Patent Application No. 2019-032991 filed on Feb. 26, 2019, the entire disclosure of which is incorporated herein by reference.

BACKGROUND OF THE INVENTION

Field of the Invention

The present invention relates to a communication apparatus.

Description of the Related Art

Mobile communications require the effective use of limited network resources. Changing the connection state between a wireless base station and user equipment to an idle state once a predetermined amount of time has passed following the end of communication with the user equipment is disclosed in 3GPP TS 36.331 V15.3.0, "Radio Resource Control (RRC) (Release 15)", September 2018. This makes it possible to use the resources which have been freed up to communicate with other user equipment.

SUMMARY OF THE INVENTION

If, after the connection between the user equipment and the wireless base station has entered an idle state, the user equipment starts communicating again, a delay of approximately several hundreds of milliseconds will arise. Depending on the state of operations of the user equipment, such delay may not be permissible. An aspect of the present invention provides a technique for reducing delay in accordance with the operating state of user equipment.

Some embodiments of the present invention provide a communication apparatus comprising: an obtaining unit configured to obtain information indicating an operation state of a user equipment; and a determining unit configured to determine, based on the operation state of the user equipment, a change time taken by a changing unit to change communication between the user equipment and a wireless base station to an idle state after a predetermined condition has been met.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Figure 1:
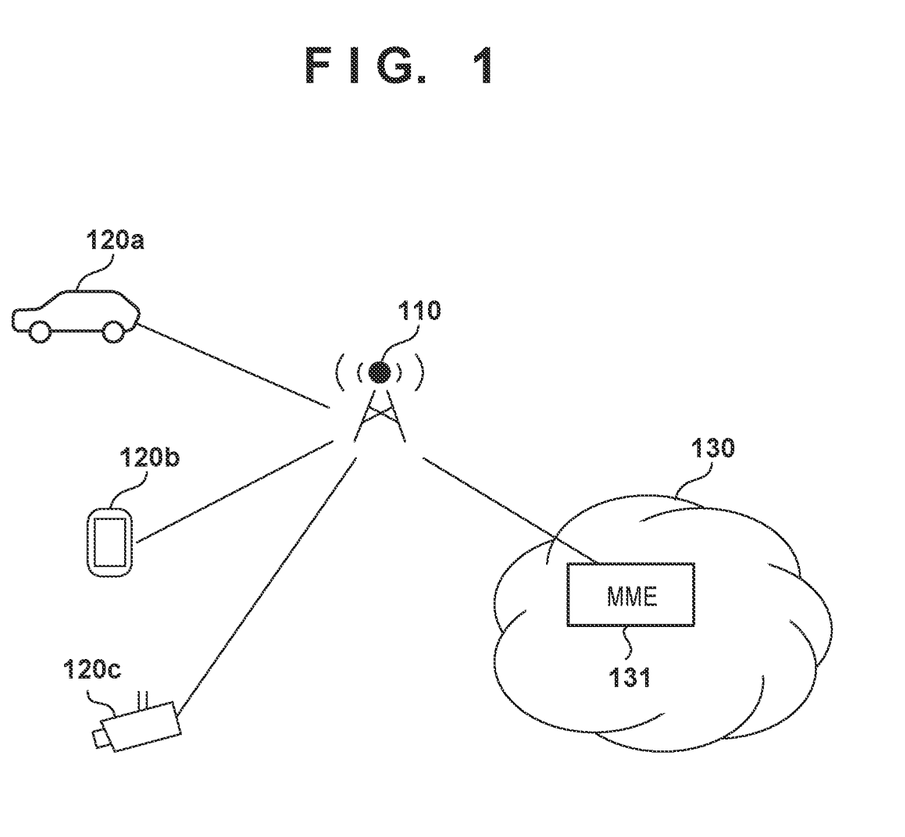
FIG. 1 is a schematic diagram illustrating an example of the configuration of a communication system according to an embodiment.

An example of the configuration of a communication system according to some embodiments will be described with reference to FIG. 1. The following will describe a communication system compliant with Long Term Evolution (LTE) as an example. However, the present invention may instead be applied to a different communication standard, such as 3G or 5G. In such a case, the names of network entities, messages, and the like given in the following descriptions can be replaced as appropriate.

The communication system includes a wireless base station 110, a plurality of user equipment (UE) 120a to 120c, and a core network 130. The core network 130 includes a network entity such as a Mobility Management Entity (MME) 131. Other network entities included in the core network 130 may have known configurations, for example, and will therefore not be described here.

The wireless base station 110 is a communication apparatus for providing wireless connections with the user equipment 120a to 120c. The wireless base station 110 is also connected to the MME 131. The wireless base station 110 is also called "eNodeB".

The user equipment 120a to 120c include various types of communication apparatuses, such as a vehicle 120a, a mobile terminal 120b, and a surveillance camera 120c. When there is no need to distinguish among the types of the user equipment 120a to 120c, they will be referred to simply as "user equipment 120". The mobile terminal 120b includes a mobile phone, a smartphone, a tablet device, and the like. The surveillance camera 120c is an example of an Internet of Things (IoT) device. IoT devices may include roadside devices such as surveillance cameras and sensors, as well as household appliances such as televisions, refrigerators, and water heaters. Compared to the vehicle 120a and the mobile terminal 120b, the IoT device may be a device that is used in a stationary state, a device with a low amount of wireless communication at a predetermined cycle, or a device that wirelessly communicates only limited types of information. The MME 131 authenticates the user equipment 120, makes requests to configure communication routes to partner devices, and so on.

Figure 2:
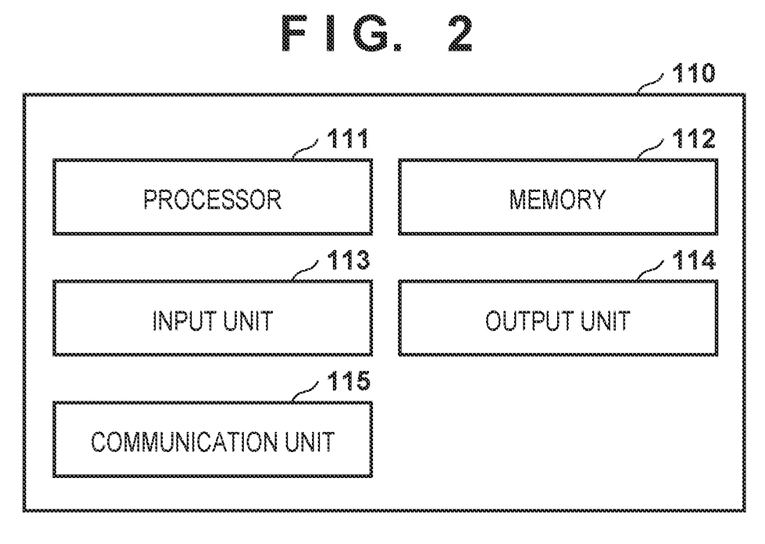
FIG. 2 is a block diagram illustrating an example of the configuration of a wireless base station according to an embodiment.

An example of the configuration of the wireless base station 110 will be described next with reference to FIG. 2. The wireless base station 110 includes a processor 111, memory 112, an input unit 113, an output unit 114, and a communication unit 115.

The processor 111 controls the overall operations of the wireless base station 110. The processor 111 functions as a CPU, for example. The memory 112 stores programs, temporary data, and the like used for the operations of the wireless base station 110. The memory 112 is realized by ROM, RAM, or the like, for example. The memory 112 may further include secondary storage such as a hard disk drive. The input unit 113 is used for the user of the wireless base station 110 to make inputs to the wireless base station 110. The output unit 114 is used to output information from the wireless base station 110 to the user, and is realized by a display device (a display), an audio device (a speaker), or the like, for example. The communication unit 115 provides a function for the wireless base station 110 to communicate with another apparatus such as the user equipment 120 and the MME 131, and is realized by an antenna, a baseband processor, and the like, for example.

Figure 3:
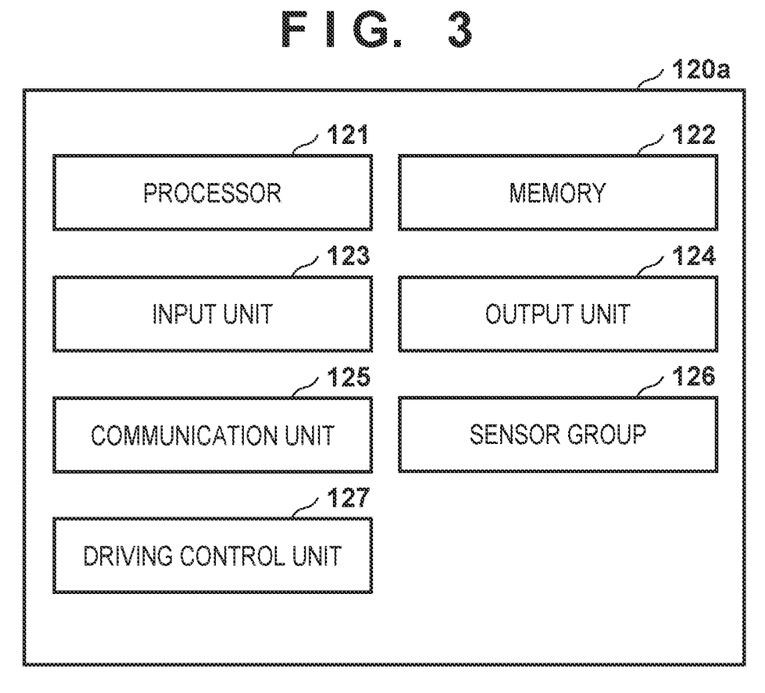
FIG. 3 is a block diagram illustrating an example of the configuration of a vehicle according to an embodiment.

An example of the configuration of the vehicle 120a will be described next with reference to FIG. 3. The vehicle 120a includes a processor 121, memory 122, an input unit 123, an output unit 124, a communication unit 125, a sensor group 126, and a driving control unit 127. The user equipment 120 aside from the vehicle 120a include the processor 121, the memory 122, the communication unit 125, and constituent elements unique to that particular user equipment (e.g., an image sensor and the like in the surveillance camera 120c). FIG. 3 primarily illustrates the constituent elements which will be used to describe the embodiment, and thus constituent elements unique to the vehicle 120a, such as steering and brakes, are not illustrated.

The processor 121 controls the overall operations of the vehicle 120a. The processor 121 functions as a CPU, for example. The memory 122 stores programs, temporary data, and the like used for the operations of the vehicle 120a. The memory 122 is realized by ROM, RAM, or the like, for example. The memory 122 may further include secondary storage such as a hard disk drive. The input unit 123 is used for the user of the vehicle 120a (e.g., the driver or a passenger) to make inputs to the vehicle 120a. The output unit 124 is used to output information from the vehicle 120a to the user, and is realized by a display device (a display), an audio device (a speaker), or the like, for example. The communication unit 125 provides a function for the vehicle 120a to communicate with another apparatus such as the wireless base station 110 or another vehicle, and is realized by an antenna, a baseband processor, and the like, for example.

The sensor group 126 is one or more sensors for obtaining the state of the vehicle 120a, the state of the driver, information of the surrounding of the vehicle 120a, and so on. The sensor group 126 includes, for example, cameras that capture the outside of the vehicle, Light Detection and Ranging (LIDAR) or millimeter wave radar for detecting and measuring the distance to objects outside the vehicle, a Global Positioning System (GPS) sensor for measuring the geographical location of the vehicle 120a, and the like.

The driving control unit 127 automatically controls at least one of the steering and acceleration/deceleration of the vehicle 120a. The driving control unit 127 is constituted by an ECU, for example. The vehicle 120a can take on a remote driving state, an automated driving state, a manual driving state, and a vehicle drive source inactive state.

The remote driving state is a state in which the vehicle 120a travels based on commands issued from outside the vehicle 120a. For example, the driving control unit 127 sends information obtained by the sensor group 126 to an operator device at a location distanced from the vehicle 120a through the wireless base station 110 and the core network 130. Based on this information, the operator generates commands for maneuvering the vehicle 120a and sends those commands to the vehicle 120a. In accordance with these commands, the driving control unit 127 automatically controls at least one of the steering and the acceleration/deceleration of the vehicle 120a.

The automated driving state is a state in which the vehicle 120a travels based on information from the sensor group 126. For example, the driving control unit 127 sets the route of the vehicle 120a based on information obtained by the sensor group 126, and automatically controls at least one of the steering and the acceleration/deceleration of the vehicle 120a so that the vehicle 120a travels along that route.

The manual driving state is a state in which the driver of the vehicle 120a drives the vehicle by hand. The vehicle 120a may carry out driving assistance during manual driving. The vehicle drive source inactive state is a state in which the drive source of the vehicle 120a is inactive. For example, if the drive source of the vehicle 120a is an engine, the inactive state is a state in which the ignition is turned off and the engine is stopped. If the drive source of the vehicle 120a is a motor, the inactive state is a state in which a drive switch is turned off. On the other hand, a state in which the drive source of the vehicle 120a is active will be called a "vehicle drive source active state". For example, if the drive source of the vehicle 120a is an engine, the active state is a state in which the ignition is turned on and the engine is running. If the drive source of the vehicle 120a is a motor, the active state is a state in which a drive switch is turned on. The aforementioned remote driving state, automated driving state, and manual driving state are all included in the vehicle drive source active state.

Figure 4A:
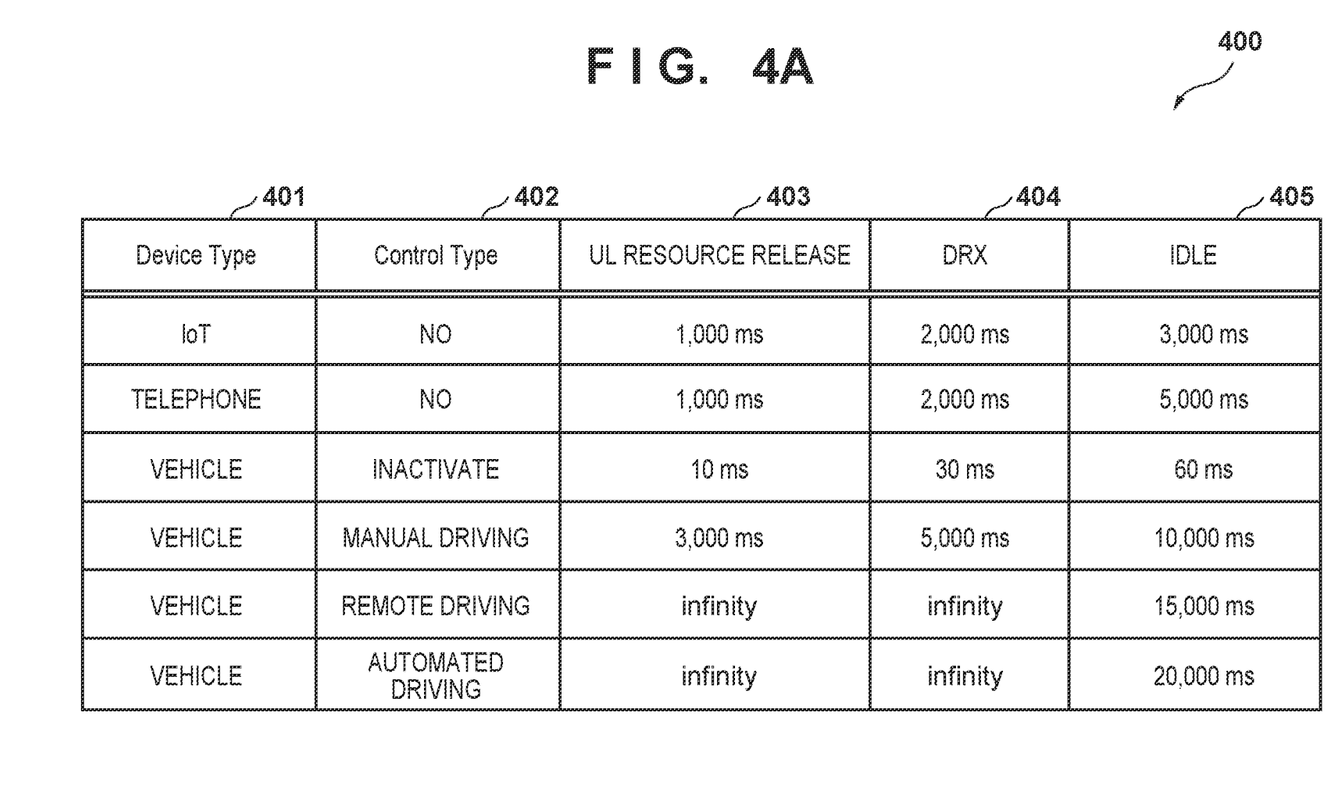
FIGS. 4A and 4B are diagrams illustrating timer information according to an embodiment.
Figure 4B:
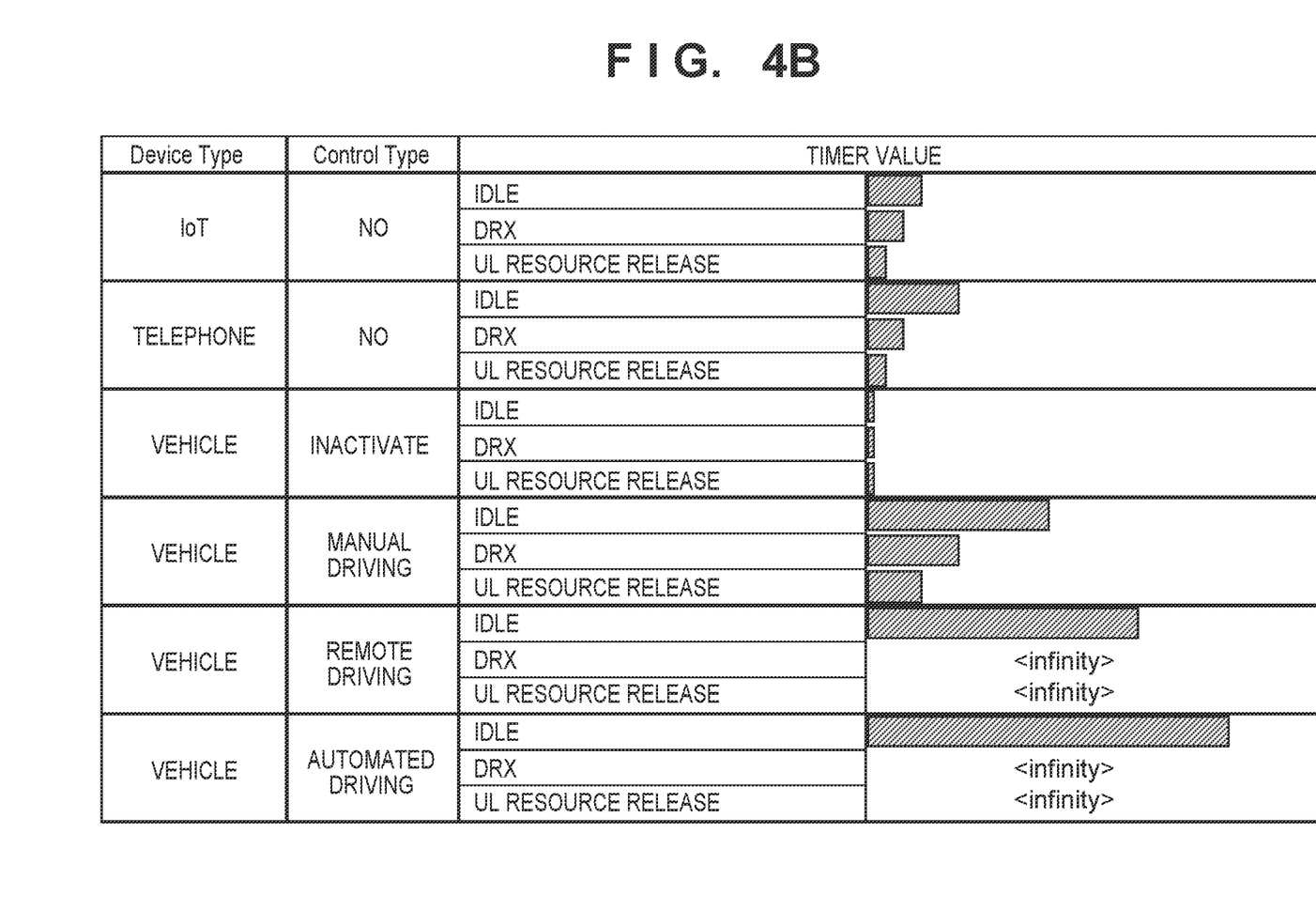

An example of timer information 400 used for changing a connection state between the wireless base station 110 and the user equipment 120 will be described next with reference to FIGS. 4A and 4B. FIG. 4A is a diagram illustrating the timer information 400 in table format, and FIG. 4B is a diagram illustrating the timer information in bar graph format. The timer information 400 defines the time it takes to change the connection state with the user equipment 120 after the communication between the wireless base station 110 and the user equipment 120 ends (called a "timer value" hereinafter). Column 401 indicates the type of the user equipment 120. The type of the user equipment 120 includes "vehicle" (the vehicle 120a), "IoT" (the surveillance camera 120c or the like), and "telephone" (the mobile terminal 120b or the like), for example. Column 402 indicates the operation state of the user equipment 120. If the type of the user equipment 120 is the vehicle 120a, the operation state includes "remote driving" (the remote driving state), "automated driving" (the automated driving state), "manual driving" (the manual driving state), and "inactive" (the vehicle drive source inactive state).

Column 403 indicates the timer value from when the wireless base station 110 ends communication with the user equipment 120, to when the connection state with the user equipment 120 changes to an uplink (UL) resource released state. Column 404 indicates the timer value from when the wireless base station 110 ends communication with the user equipment 120, to when the connection state with the user equipment 120 changes to a discontinuous reception (DRX) state. Column 405 indicates the timer value from when the wireless base station 110 ends communication with the user equipment 120, to when the connection state with the user equipment 120 changes to an idle state.

As indicated by the timer information 400, the timer values for changing the connection state with the user equipment 120 are based on the type of the user equipment 120. Furthermore, if the type of the user equipment 120 is the vehicle 120a, the timer value for changing the connection state with the user equipment 120 is based on the operation state of the user equipment 120. In the example illustrated in FIGS. 4A and 4B, the timer values for changing the connection state with the user equipment 120 are constant (not based on the operation state) in situations where the type of the user equipment 120 is a type aside from the vehicle 120a, but these timer values may be based on the operation states instead.

When the type of the user equipment 120 is the vehicle 120a and the operation state of the vehicle 120a is the automated driving state, the timer value for changing to the idle state is represented by T1 (20,000 ms, in this example). When the type of the user equipment 120 is the vehicle 120a and the operation state of the vehicle 120a is the remote driving state, the timer value for changing to the idle state is represented by T2 (15,000 ms, in this example). When the type of the user equipment 120 is the vehicle 120a and the operation state of the vehicle 120a is the manual driving state, the timer value for changing to the idle state is represented by T3 (10,000 ms, in this example). When the type of the user equipment 120 is the vehicle 120a and the operation state of the vehicle 120a is the vehicle drive source inactive state, the timer value for changing to the idle state is represented by T4 (60 ms, in this example).

In this case, T1>T2>T3>T4 is satisfied. Specifically, the timer values when the type of the user equipment is the vehicle 120a and the operation state of the vehicle 120a is a vehicle drive source active state (the manual driving state, the remote driving state, or the automated driving state) (i.e., the timer values T1, T2, and T3) are all longer than the timer value when the type of the user equipment is the vehicle 120a and the operation state of the vehicle 120a is the vehicle drive source inactive state (i.e., the timer value T4). Furthermore, the timer values when the type of the user equipment is the vehicle 120a and the operation state of the vehicle 120a is not a manual driving state (the remote driving state or the automated driving state) (i.e., the time values T1 and T2) are longer than the timer value when the type of the user equipment is the vehicle 120a and the vehicle 120a is in the manual driving state (i.e., the timer value T3). During remote driving and automated driving, shortening the communication delay makes it possible to obtain information from other vehicles, commands from a remote operator, and the like in a more timely manner, which helps ensure safe travel. As such, setting T1 and T2 to be longer makes it possible to suppress a change to the idle state for a long period of time, even after the communication between the user equipment 120 and the wireless base station 110 has ended, which in turn makes it possible to suppress the occurrence of long delays (e.g., approximately several hundreds of milliseconds). Meanwhile, setting T4 to be shorter during the vehicle drive source inactive state makes it possible to change to idle state quickly after the communication between the user equipment 120 and the wireless base station 110 has ended, which in turn makes it possible to reduce the amount of battery power consumed.

The magnitude relationship between the timer value when the type of the user equipment is the vehicle 120a and the operation state of the vehicle 120a is the automated driving state (i.e., the timer value T1) and the timer value when the type of the user equipment is the vehicle 120a and the operation state of the vehicle 120a is the remote driving state (i.e., the timer value T2) is not limited to the above-described example. For example, the relationship may be T1>T2, T1=T2, T1<T2, or T1<T2.

When the type of the user equipment 120 is "telephone", the timer value for changing to the idle state is represented by T5 (5,000 ms, in this example). When the type of the user equipment 120 is "IoT", the timer value for changing to the idle state is represented by T6 (3,000 ms, in this example). In this case, T1>T2>T3>T5>T6>T4 is satisfied. Specifically, the timer values when the type of the user equipment is the vehicle 120a and the operation state of the vehicle 120a is a vehicle drive source active state (the manual driving state, the remote driving state, or the automated driving state) (i.e., the timer values T1, T2, and T3) are longer than the timer values when the type of the user equipment is a type aside from "vehicle" (i.e., the timer values T5 and T6). On the other hand, the timer value when the type of the user equipment is the vehicle 120a and the operation state of the vehicle 120a is the vehicle drive source inactive state (i.e., the timer value T4) is shorter than the timer values when the type of the user equipment is a type aside from "vehicle" (i.e., the timer values T5 and T6).

When the type of the user equipment 120 is a type aside from "vehicle" (i.e., "IoT" or "telephone") and when the type of the user equipment 120 is the vehicle 120a and the operation state thereof is the inactive state or the manual driving state, the timer value until the change to the UL resource released state is shorter than the timer value until the change to the DRX state, and the timer value until the change to the DRX state is shorter than the timer value until the change to the idle state. Accordingly, the user equipment 120 enters the UL resource released state once the timer value defined in column 403 has passed after the end of communication; then enters the DRX state once the timer value defined in the column 404 has passed; and finally enters the idle state once the timer value defined in column 405 has passed. On the other hand, when the type of the user equipment 120 is the vehicle 120a and the operation state thereof is the automated driving state or the remote driving state, the timer value until the change to the UL resource released state and the timer value until the change to the DRX state are longer than the timer value until the change to the idle state. Accordingly, the user equipment 120 enters the idle state once the timer value defined in column 405 has passed following the end of communication. Furthermore, the timer value until the change to the UL resource released state and the timer value until the change to the DRX state are both "infinity", and thus the user equipment 120 enters neither the UL resource released state nor the DRX state.

The timer information 400 may include a column indicating the name of the vehicle's manufacturer. The timer values in the columns 403, 404, and 405 may then be based on the name of the vehicle's manufacturer. This makes it possible to change the connection state between the user equipment 120 and the wireless base station 110 using timer values based on the designs from each manufacturer.

Figure 5:
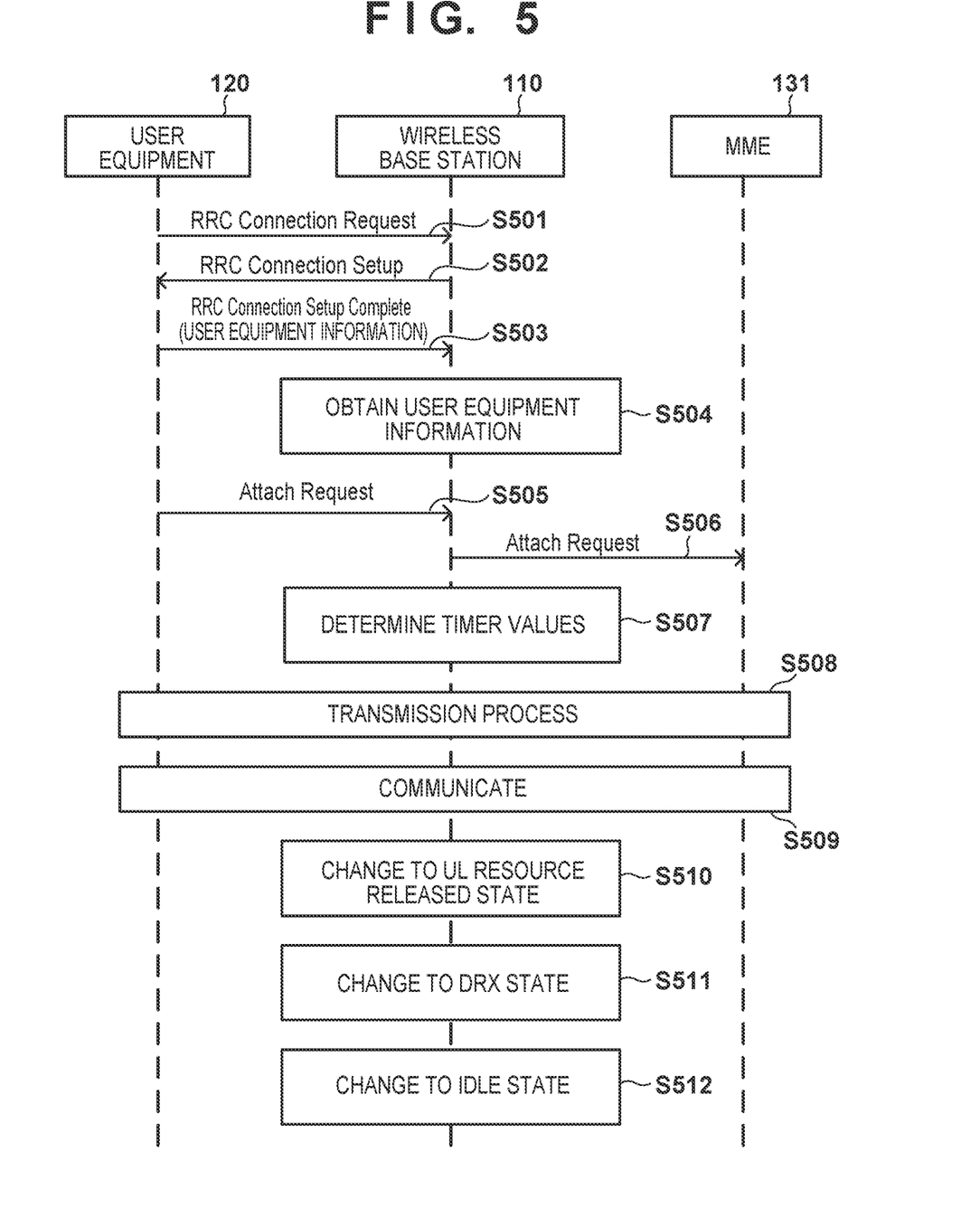
FIG. 5 is a sequence chart illustrating an example of operations carried out by the communication system according to an embodiment.
Figure 6:
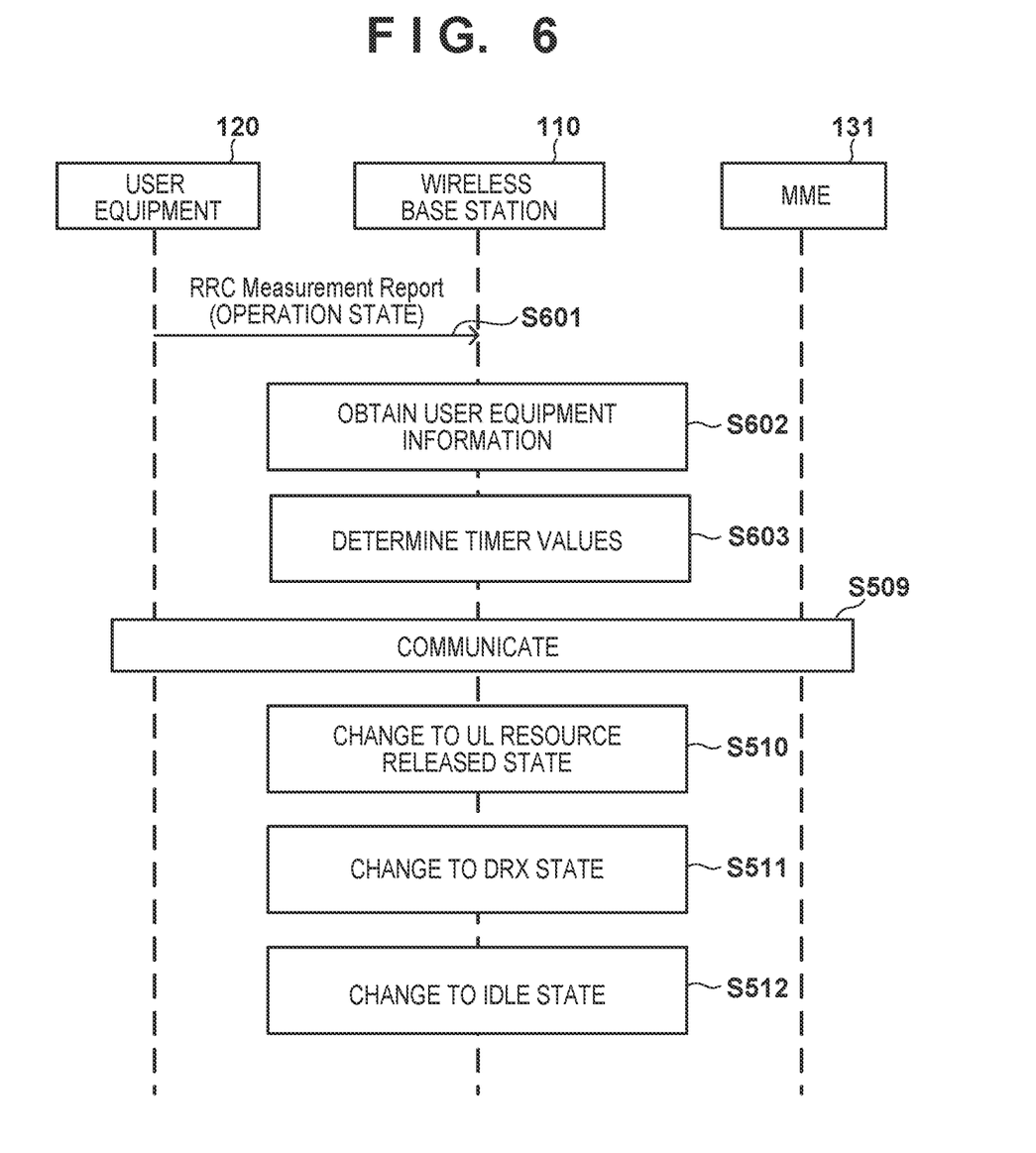
FIG. 6 is a sequence chart illustrating an example of operations carried out by the communication system according to an embodiment.

An example of operations carried out by the communication system illustrated in FIG. 1 will be described next with reference to FIGS. 5 and 6. Each step in the method illustrated in FIGS. 5 and 6 is carried out by the processors of the apparatuses (the wireless base station 110, the user equipment 120, and the MME 131) executing programs stored in memory, for example. However, some or all of the steps in these methods may instead be realized by hardware such as Application-Specific Integrated Circuits (ASICs). It is assumed that a connection is not yet established between the user equipment 120 and the wireless base station 110 at the point in time when the operations illustrated in FIG. 5 start. Unless otherwise specified, the functions of the signals in the following descriptions may be the same as those found conventionally, and will therefore not be described in detail here.

In step S501, the user equipment 120 sends an RRC Connection Request to the wireless base station 110 through Radio Resource Control (RRC). In response, the wireless base station 110 sends an RRC Connection Setup to the user equipment through RRC in step S502. In response, the user equipment 120 sends an RRC Connection Setup Complete to the wireless base station 110 through RRC in step S503. The user equipment 120 includes its own type (e.g., "vehicle") and/or its own operation state (e.g., "remote driving state") in the RRC Connection Setup Complete. The user equipment 120 may include the name of its own manufacturer in this signal (e.g., "Honda Motor Co., Ltd."). Information pertaining to the type of the user equipment 120, the operation state of the user equipment, and/or the name of the user equipment's manufacturer will be called "user equipment information" hereinafter.

In step S504, the wireless base station 110 obtains the user equipment information by reading out the user equipment information from the RRC Connection Setup Complete. In step S505, the user equipment 120 sends an Attach Request to the wireless base station 110 through RRC. In response, the wireless base station 110 sends an Attach Request to the MME 131 through S1-AP in step S506.

In step S507, the wireless base station 110 refers to the timer information 400, and determines each timer value for the user equipment 120 (the timer values indicated in columns 403 to 405) based on the user equipment information obtained in step S504. The timer information 400 may be stored in the memory 112 of the wireless base station 110 in advance, and the processor 111 of the wireless base station 110 may determine the timer values by referring to the timer information 400 stored in the memory 112.

In step S508, a transmission process is carried out in the communication system. After the transmission process ends, the connection state of the user equipment 120 enters an active state. In step S509, the user equipment 120 communicates with another apparatus through the wireless base station 110.

Once the timer value determined in step S507 with reference to column 403 has passed after the communication in step S509 has ended, in step S510, the wireless base station 110 changes the connection state with the user equipment 120 to the UL resource released state. Once the timer value determined in step S507 with reference to column 404 has passed after the communication in step S509 has ended, in step S511, the wireless base station 110 changes the connection state with the user equipment 120 to the DRX state. Once the timer value determined in step S507 with reference to column 405 has passed after the communication in step S509 has ended, in step S512, the wireless base station 110 changes the connection state with the user equipment 120 to the idle state.

If the timer value defined in column 403 is longer than the timer value defined in column 405, the wireless base station 110 changes the connection state with the user equipment 120 to the idle state without changing the state to the UL resource released state. Additionally, if the timer value defined in column 404 is longer than the timer value defined in column 405, the wireless base station 110 changes the connection state with the user equipment 120 to the idle state without changing the state to the DRX state. According to the examples illustrated in FIGS. 4A and 4B, when the type of the user equipment 120 is the vehicle 120a and the operation state thereof is the remote driving state or the automated driving state, the timer value in column 403 and the timer value in column 404 are longer than the timer value in column 405, and thus the wireless base station 110 changes the connection state with the user equipment 120 to the idle state without changing to the UL resource released state or the DRX state.

Next, an example of operations carried out when the operation state of the user equipment 120 has been changed will be described with reference to FIG. 6. It is assumed that a connection is already established between the user equipment 120 and the wireless base station 110, and that the connection state is the active state, at the point in time when the operations illustrated in FIG. 6 start.

When the operation state of the user equipment 120 is changed, in step S601, the user equipment 120 sends an RRC Measurement Report through RRC to the wireless base station 110. The user equipment 120 includes the post-change operation state in the RRC Measurement Report. In step S602, the wireless base station 110 obtains the operation state by reading out the post-change operation state from the RRC Measurement Report.

In step S603, the wireless base station 110 refers to the timer information 400 to determine the type of the user equipment 120 and (if included) the name of the manufacturer of the user equipment 120, obtained in step S504, and the timer values based on the operation state of the user equipment 120, obtained in step S602 (the timer values indicated in columns 403 to 405). The timer information 400 may be stored in the memory 112 of the wireless base station 110 in advance, and the processor 111 of the wireless base station 110 may determine the timer values by referring to the timer information 400 stored in the memory 112. The operations following thereafter are the same as in steps S509 to S512.

If in step S602 it has been detected that the type of the user equipment 120 is the vehicle 120a and the operation state thereof has been changed from the remote driving state to the manual driving state, the wireless base station 110 may continue to use the timer values for the remote driving state in step S603. This makes it possible to suppress a situation where the state is quickly changed from the active state even immediately after the state has returned to the remote driving state from the manual driving state. Likewise, if in step S602 it has been detected that the type of the user equipment 120 is the vehicle 120a and the operation state thereof has been changed from the automated driving state to the manual driving state, the wireless base station 110 may continue to use the timer values for the automated driving state in step S603.

In the example described above, the user equipment 120 sent the user equipment information to the wireless base station 110 in the RRC Connection Setup Complete or the RRC Measurement Report. However, the user equipment 120 may send the user equipment information to the wireless base station 110 in a Direct Transfer or an Attach Complete. Alternatively, the user equipment 120 may send the user equipment information to the wireless base station 110 using another message.

Figure 7:
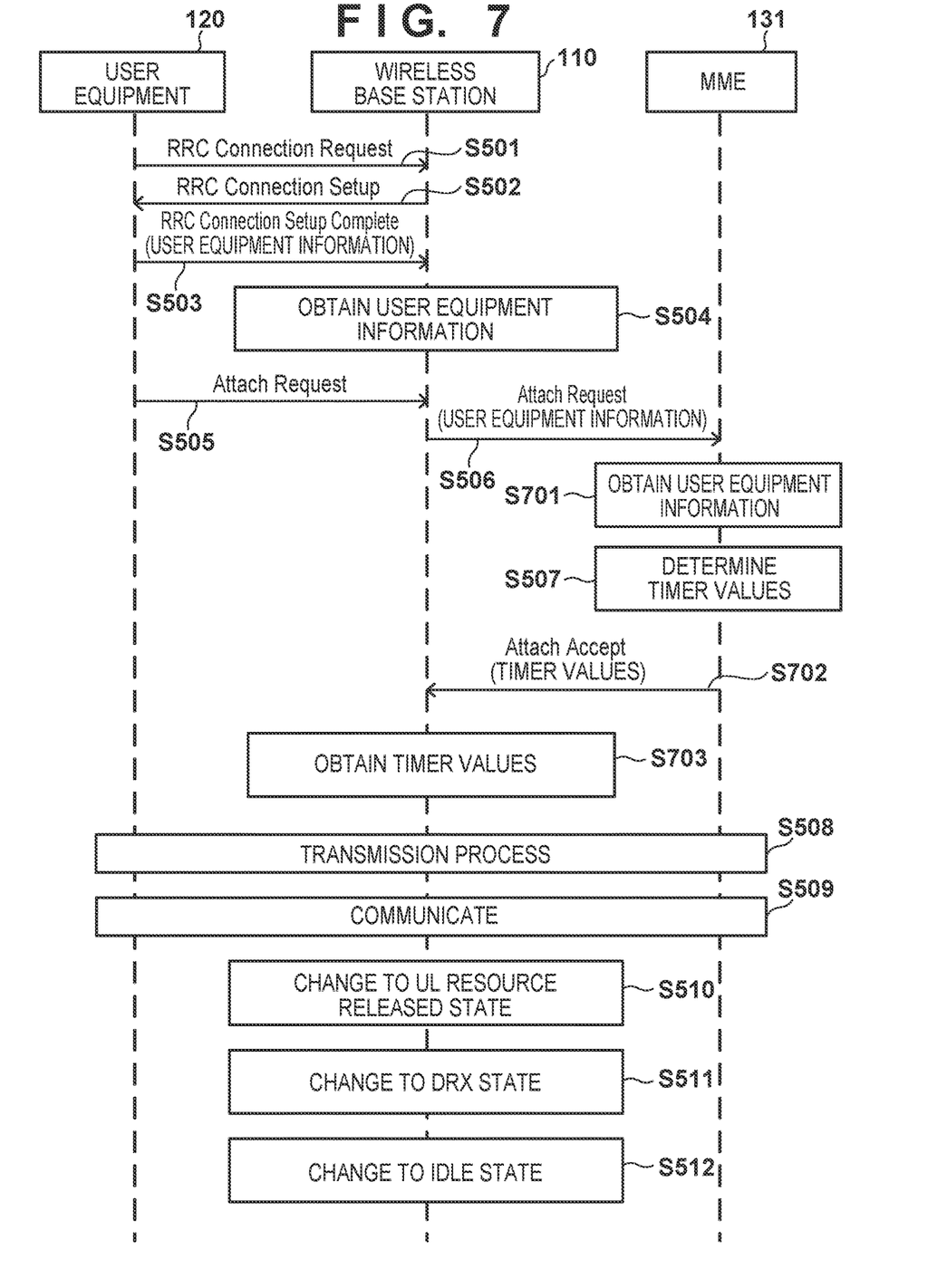
FIG. 7 is a sequence chart illustrating an example of operations carried out by the communication system according to an embodiment.

A variation on the operations carried out by the communication system in FIG. 5 will be described next with reference to FIG. 7. In the example illustrated in FIG. 5, the wireless base station 110 which is communicating with the user equipment 120 executes step S507, but in FIG. 7, a communication apparatus aside from the wireless base station 110 executes step S507. The communication apparatus that executes step S507 may be a wireless base station not currently communicating with the user equipment 120, the user equipment 120 itself, a communication apparatus in the core network 130 (e.g., the MME 131), another communication apparatus connected to the core network 130 over the Internet, or the like. The communication between the user equipment 120 and the communication apparatus may be carried out through a route that goes through the wireless base station 110, or through another route. The following will describe a case where the MME 131 executes step S507. An example of the configuration of the MME 131 may be the same as the example of the configuration of the wireless base station 110 illustrated in FIG. 2, and will therefore not be described here. Each step in the method illustrated in FIG. 7 is carried out by the processors of the apparatuses (the user equipment 120, the wireless base station 110, and the MME 131) executing programs stored in memory, for example. However, some or all of the steps in these methods may instead be realized by hardware such as Application-Specific Integrated Circuits (ASICs).

Steps S501 to S505 are the same as in FIG. 5. In step S506, the wireless base station 110 sends the user equipment information to the MME 131 in an Attach Request. In step S701, the MME 131 obtains the user equipment information by reading out the user equipment information from the Attach Request. In step S507, the MME 131 determines each timer value for the user equipment 120 (the timer values indicated in columns 403 to 405) based on the user equipment information, in the same manner as in FIG. 5. The timer information 400 may be stored in the memory of the MME 131 in advance.

In step S702, the MME 131 sends the timer values to the wireless base station 110 in an Attach Accept. In step S703, the wireless base station 110 obtains the timer values by reading out the timer values from the Attach Accept. The operations of steps S508 and on are the same as in FIG. 5.

When a communication apparatus aside from the MME 131 executes step S507, the user equipment information is sent from the wireless base station 110 to that communication apparatus, and the timer values are sent from that communication apparatus to the wireless base station 110. When executing step S507 itself, the user equipment 120 already has the user equipment information, and thus the process of sending the user equipment information to the user equipment 120 can be omitted.

Figure 8:
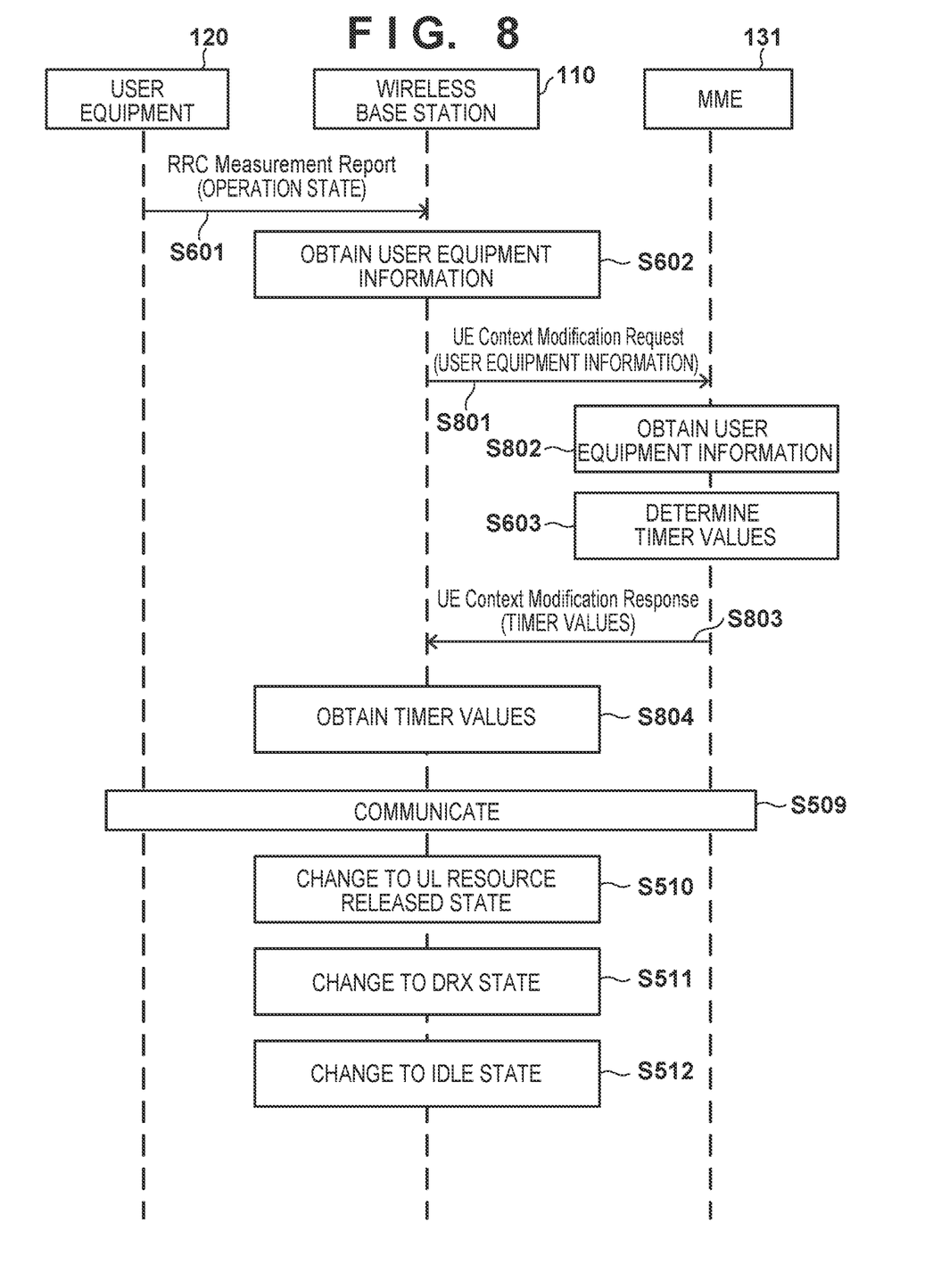
FIG. 8 is a sequence chart illustrating an example of operations carried out by the communication system according to an embodiment.

A variation on the operations carried out by the communication system in FIG. 6 will be described next with reference to FIG. 8. In the example illustrated in FIG. 6, the wireless base station 110 which is communicating with the user equipment 120 executes step S603, but in FIG. 8, a communication apparatus aside from the wireless base station 110 executes step S603. The communication apparatus that executes step S603 may be the same as the communication apparatus that executes step S507 as illustrated in FIG. 7. The following will describe a case where the MME 131 executes step S603. Each step in the method illustrated in FIG. 8 is carried out by the processors of the apparatuses (the user equipment 120, the wireless base station 110, and the MME 131) executing programs stored in memory, for example. However, some or all of the steps in these methods may instead be realized by hardware such as Application-Specific Integrated Circuits (ASICs).

Steps S601 and S602 are the same as in FIG. 6. In step S801, the wireless base station 110 sends the post-change operation state of the user equipment 120 to the MME 131 in a UE Context Modification Request. In step S802, the MME 131 obtains the post-change operation state of the user equipment 120 by reading out that operation state from the UE Context Modification Request. In step S603, the MME 131 determines each timer value for the user equipment 120 (the timer values indicated in columns 403 to 405) based on the user equipment information, in the same manner as in FIG. 6.

In step S803, the MME 131 sends the timer values to the wireless base station 110 in a UE Context Modification Response. In step S804, the wireless base station 110 obtains the timer values by reading out the timer values from the UE Context Modification Response. The operations of steps S509 and on are the same as in FIG. 6.

When a communication apparatus aside from the MME 131 executes step S603, the post-change operation state of the user equipment 120 is sent from the wireless base station 110 to that communication apparatus, and the timer values are sent from that communication apparatus to the wireless base station 110. When executing step S603 itself, the user equipment 120 already has the post-change operation state of the user equipment 120, and thus the process for sending the operation state to the user equipment 120 can be omitted.

In the foregoing embodiment, the counting of the timer values for changing to the UL resource released state, the DRX state, and the idle state is started at the point in time when the communication between the user equipment 120 and the wireless base station 110 ends. However, the counting of the timer values may instead be started after other predetermined conditions have been met.

Summary of Embodiments

Configuration 1
A communication apparatus (110, 120, 131) comprising:
an obtaining unit (111, S504, S602, S701, S802) configured to obtain information (402) indicating an operation state of a user equipment (120); and
a determining unit (111, S507, S603) configured to determine, based on the operation state of the user equipment, a change time taken by a changing unit (111, S512) to change communication between the user equipment and a wireless base station (110) to an idle state after a predetermined condition has been met.
According to this configuration, the time taken to change to the idle state can be determined in accordance with the operation state of the user equipment, and a situation where a long delay arises can be suppressed.
Configuration 2
The communication apparatus according to Configuration 1, wherein
the obtaining unit further obtains information (401) indicating a type of the user equipment, and
the determining unit determines the change time also based on the type of the user equipment.
According to this configuration, the change time until the change to the idle state can be determined in accordance with the type of the user equipment.
Configuration 3
The communication apparatus according to Configuration 2, wherein Ta>Tb is satisfied, Ta being the change time in a case where the type of the user equipment is a vehicle, and the operation state of the vehicle is a vehicle drive source active state, and Tb being the change time in a case where the type of the user equipment is a vehicle, and the operation state of the vehicle is a vehicle drive source inactive state.
According to this configuration, an appropriate change time can be determined in accordance with the operation state of the vehicle.

Configuration 4

The communication apparatus according to Configuration 2 or 3, wherein Tc>Td is satisfied, Tc being the change time in a case where the type of the user equipment is a vehicle, and the operation state of the vehicle is a non-manual driving state, and Td being the change time in a case where the type of the user equipment is a vehicle, and the operation state of the vehicle is a manual driving state.

According to this configuration, an appropriate change time can be determined in accordance with the operation state of the vehicle.

Configuration 5

The communication apparatus according to any one of Configurations 2 to 4, wherein Te≥Tf is satisfied, Te being the change time in a case where the type of the user equipment is a vehicle, and the operation state of the vehicle is an automated driving state, and Tf being the change time in a case where the type of the user equipment is a vehicle, and the operation state of the vehicle is a remote driving state.

According to this configuration, an appropriate change time can be determined in accordance with the operation state of the vehicle.

Configuration 6

The communication apparatus according to any one of Configurations 2 to 4, wherein Te≤Tf is satisfied, Te being the change time in a case where the type of the user equipment is a vehicle, and the operation state of the vehicle is an automated driving state, and Tf being the change time in a case where the type of the user equipment is a vehicle, and the operation state of the vehicle is a remote driving state.

According to this configuration, an appropriate change time can be determined in accordance with the operation state of the vehicle.

Configuration 7

The communication apparatus according to any one of Configurations 2 to 6, wherein Tg>Tb is satisfied, Tb being the change time in a case where the type of the user equipment is a vehicle, and the operation state of the vehicle is a vehicle drive source inactive state, and Tg being the change time in a case where the type of the user equipment is a type aside from a vehicle.

According to this configuration, an appropriate change time can be determined in accordance with the operation state of the vehicle.

Configuration 8

The communication apparatus according to any one of Configurations 2 to 7, wherein Ta>Tg is satisfied, Ta being the change time in a case where the type of the user equipment is a vehicle, and the operation state of the vehicle is a vehicle drive source active state, and Tg being the change time in a case where the type of the user equipment is a type aside from a vehicle.

According to this configuration, an appropriate change time can be determined in accordance with the operation state of the vehicle.

Configuration 9

The communication apparatus according to any one of Configurations 2 to 8, wherein the obtaining unit further obtains information indicating a name of a manufacturer of the user equipment, and the determining unit determines the change time also based on the name of the manufacturer.

According to this configuration, the change time can be determined on a manufacturer-by-manufacturer basis.

Configuration 10

The communication apparatus according to any one of Configurations 2 to 9, wherein the change time is a first change time, the determining unit determines, based on the operation state of the user equipment, a second change time taken by the changing unit to change communication between the user equipment and the wireless base station to an uplink resource released state after the predetermined condition has been met, and the second change time is shorter than the first change time.

According to this configuration, the change time taken to change to the uplink resource released state can be determined in accordance with the operation state of the user equipment, and a situation where a long delay arises can be suppressed.

Configuration 11

The communication apparatus according to any one of Configurations 2 to 10, wherein the change time is a first change time, the determining unit determines, based on the operation state of the user equipment, a third change time taken to change communication between the user equipment and the wireless base station to a discontinuous reception state after the predetermined condition has been met, and the third change time is shorter than the first change time.

According to this configuration, the change time taken to change to the discontinuous reception state can be determined in accordance with the operation state of the user equipment, and a situation where a long delay arises can be suppressed.

Configuration 12

The communication apparatus according to any one of Configurations 1 to 11, wherein in a case where the operation state of the user equipment has changed from the automated driving state to the manual driving state, the determining unit continues to use the change time for the automated driving state.

According to this configuration, the short delay can be maintained even after returning to the automated driving state again.

Configuration 13

The communication apparatus according to any one of Configurations 1 to 11, wherein in the case where the operation state of the user equipment has changed from the remote driving state to the manual driving state, the determining unit continues to use the change time for the remote driving state.

According to this configuration, the short delay can be maintained even after returning to the remote driving state again.

Configuration 14

The communication apparatus according to any one of Configurations 1 to 13, wherein information indicating the operation state of the user equipment is sent from the user equipment in one of an RRC Connection Setup Complete, a Direct Transfer, and an Attach Complete.

According to this configuration, the information can be sent within an existing message.

Configuration 15

The communication apparatus according to any one of Configurations 1 to 14, wherein the communication apparatus is a wireless base station.

According to this configuration, the aforementioned configurations can be realized in a wireless base station.

Configuration 16

The communication apparatus according to any one of Configurations 1 to 14, wherein the communication apparatus is included in a core network.

According to this configuration, the aforementioned configuration can be realized in a device within a core network.

Configuration 17

The communication apparatus according to Configuration 16, wherein the obtaining unit obtains the operation state of the user equipment by reading out the operation state from a UE Context Modification Request.

According to this configuration, the information can be sent within an existing message.

Configuration 18

A program that causes a computer to function as the respective units of the communication apparatus according to any one of Configurations 1 to 17.

According to this configuration, the aforementioned configuration can be realized as a program.

The invention is not limited to the foregoing embodiments, and various variations/changes are possible within the spirit of the invention.

What is claimed is:

1. A communication apparatus comprising:
an obtaining unit configured to obtain information indicating an operation state of a user equipment; and
a determining unit configured to determine, based on the operation state of the user equipment, a timer value for a wireless base station to change communication between the user equipment and the wireless base station to an idle state after a predetermined condition has been met,
wherein the operation state of the user equipment includes a driving state of a vehicle.

2. The communication apparatus according to claim 1, wherein
the obtaining unit further obtains information indicating a type of the user equipment, and
the determining unit determines the timer value also based on the type of the user equipment.

3. The communication apparatus according to claim 2, wherein Ta>Tb is satisfied, Ta being the timer value in a case where the type of the user equipment is a vehicle, and the operation state of the vehicle is a vehicle drive source active state, and Tb being the timer value in a case where the type of the user equipment is a vehicle, and the operation state of the vehicle is a vehicle drive source inactive state.

4. The communication apparatus according to claim 2, wherein Tc>Td is satisfied, Tc being the timer value in a case where the type of the user equipment is a vehicle, and the operation state of the vehicle is a non-manual driving state, and Td being the timer value in a case where the type of the user equipment is a vehicle, and the operation state of the vehicle is a manual driving state.

5. The communication apparatus according to claim 2, wherein Te≥Tf is satisfied, Te being the timer value in a case where the type of the user equipment is a vehicle, and the operation state of the vehicle is an automated driving state, and Tf being the timer value in a case where the type of the user equipment is a vehicle, and the operation state of the vehicle is a remote driving state.

6. The communication apparatus according to claim 2, wherein Te≤Tf is satisfied, Te being the timer value in a case where the type of the user equipment is a vehicle, and the operation state of the vehicle is an automated driving state, and Tf being the timer value in a case where the type of the user equipment is a vehicle, and the operation state of the vehicle is a remote driving state.

7. The communication apparatus according to claim 2, wherein Tg>Tb is satisfied, Tb being the timer value in a case where the type of the user equipment is a vehicle, and the operation state of the vehicle is a vehicle drive source inactive state, and Tg being the timer value in a case where the type of the user equipment is a type aside from a vehicle.

8. The communication apparatus according to claim 2, wherein Ta>Tg is satisfied, Ta being the timer value in a case where the type of the user equipment is a vehicle, and the operation state of the vehicle is a vehicle drive source active state, and Tg being the timer value in a case where the type of the user equipment is a type aside from a vehicle is represented by Tg.

9. The communication apparatus according to claim 2, wherein
the obtaining unit further obtains information indicating a name of a manufacturer of the user equipment, and
the determining unit determines the timer value also based on the name of the manufacturer.

10. The communication apparatus according to claim 2, wherein
the timer value is a first timer value,
the determining unit determines, based on the operation state of the user equipment, a second timer value for the wireless base station to change communication between the user equipment and the wireless base station to an uplink resource released state after the predetermined condition has been met, and
the second timer value is shorter than the first timer value.

11. The communication apparatus according to claim 2, wherein
the timer value is a first timer value,
the determining unit determines, based on the operation state of the user equipment, a third timer value for the wireless base station to change communication between the user equipment and the wireless base station to a discontinuous reception state after the predetermined condition has been met, and
the third timer value is shorter than the first timer value.

12. The communication apparatus according to claim 1, wherein in a case where the operation state of the user equipment has changed from the automated driving state to the manual driving state, the determining unit continues to use the timer value for the automated driving state.

13. The communication apparatus according to claim 1, wherein in the case where the operation state of the user equipment has changed from the remote driving state to the manual driving state, the determining unit continues to use the timer value for the remote driving state.

14. The communication apparatus according to claim 1, wherein information indicating the operation state of the user equipment is sent from the user equipment in one of an RRC Connection Setup Complete, a Direct Transfer, and an Attach Complete.

15. The communication apparatus according to claim 1, wherein the communication apparatus is a wireless base station.

16. The communication apparatus according to claim 1, wherein the communication apparatus is included in a core network.

17. The communication apparatus according to claim 16, wherein the obtaining unit obtains the operation state of the user equipment by reading out the operation state from a UE Context Modification Request.

18. A non-transitory storage medium storing one or more programs including instructions for:
  obtaining information indicating an operation state of a user equipment; and
  determining, based on the operation state of the user equipment, a timer value for a wireless base station to change communication between the user equipment and the wireless base station to an idle state after a predetermined condition has been met,
  wherein the operation state of the user equipment includes a driving state of a vehicle.

\* \* \* \* \*